Figure 1:
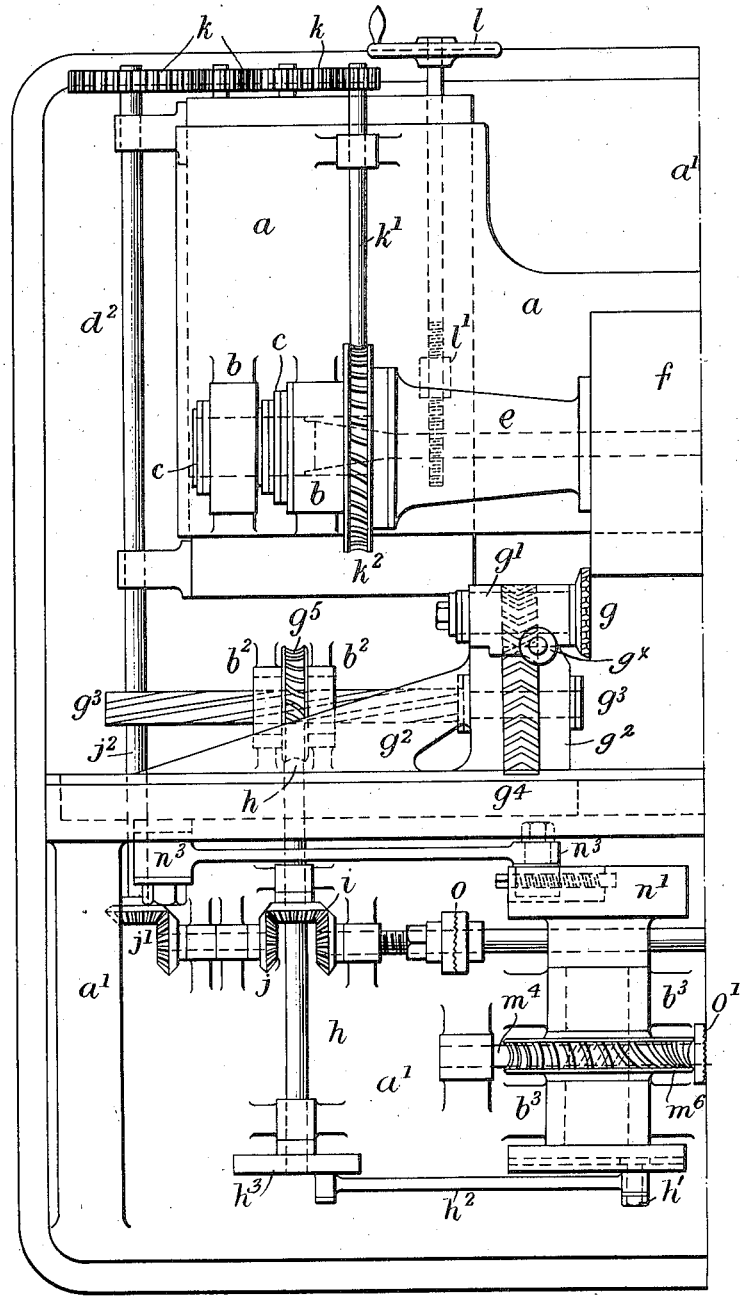

W. E. SYKES.
MACHINE FOR CUTTING HELICAL TEETH OF GEAR WHEELS.
APPLICATION FILED JAN. 6, 1912.

1,103,851.

Patented July 14, 1914.
4 SHEETS—SHEET 1.

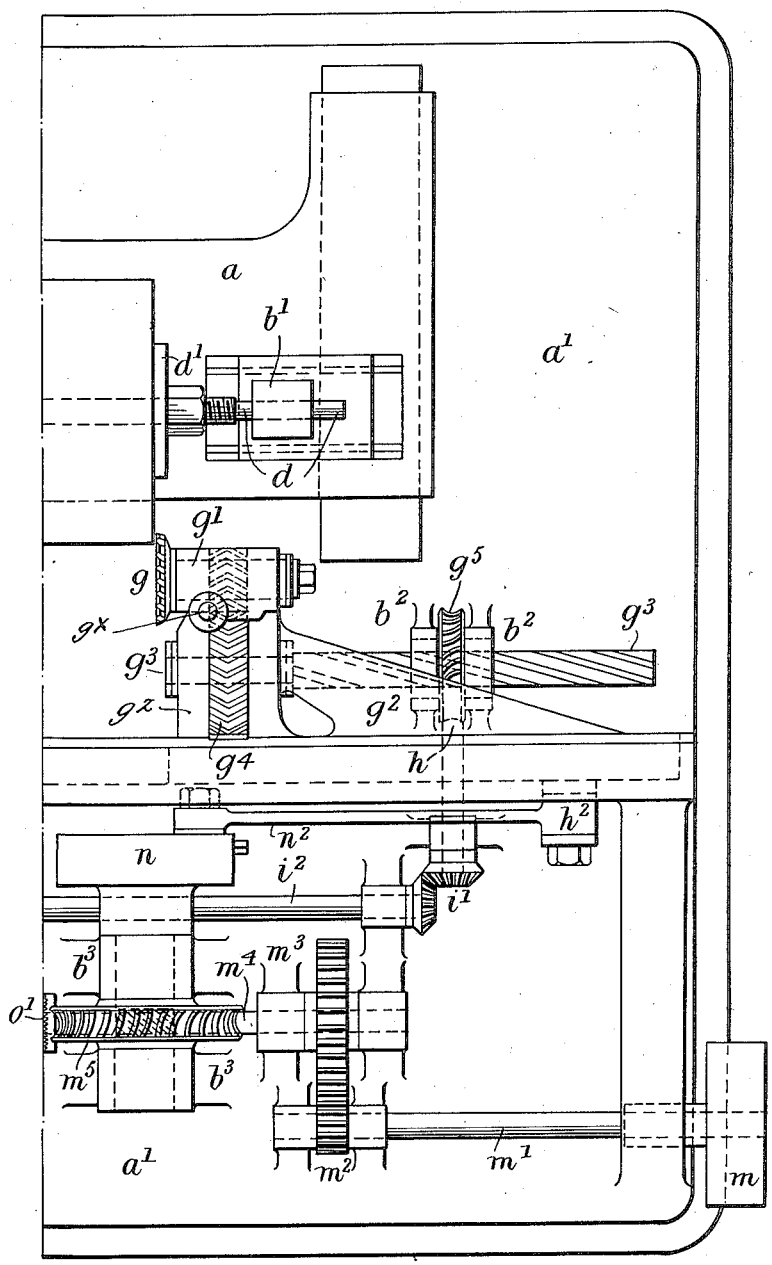

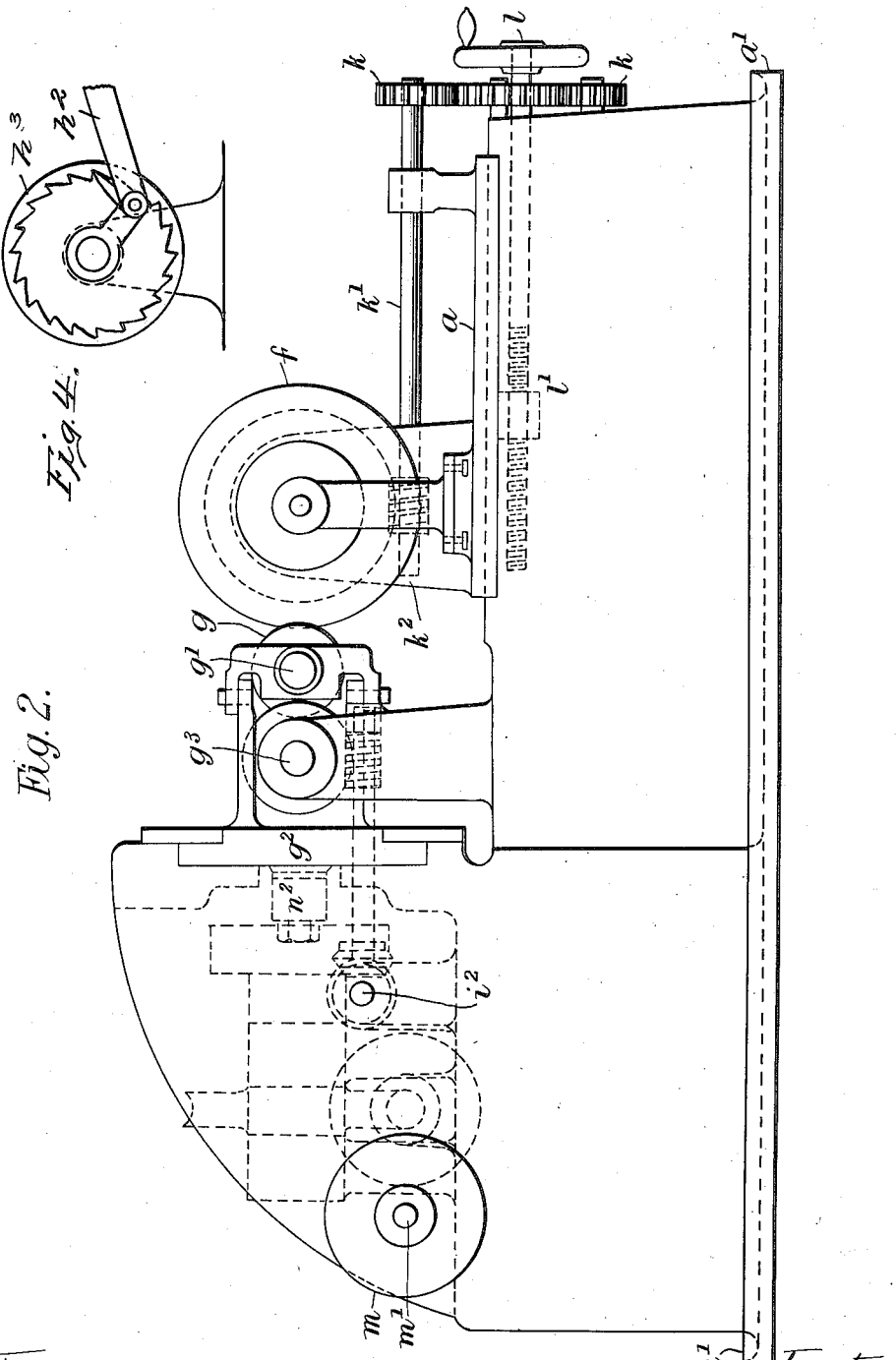

W. E. SYKES.
MACHINE FOR CUTTING HELICAL TEETH OF GEAR WHEELS.
APPLICATION FILED JAN. 6, 1912.
1,103,851.
Patented July 14, 1914.
4 SHEETS—SHEET 4.
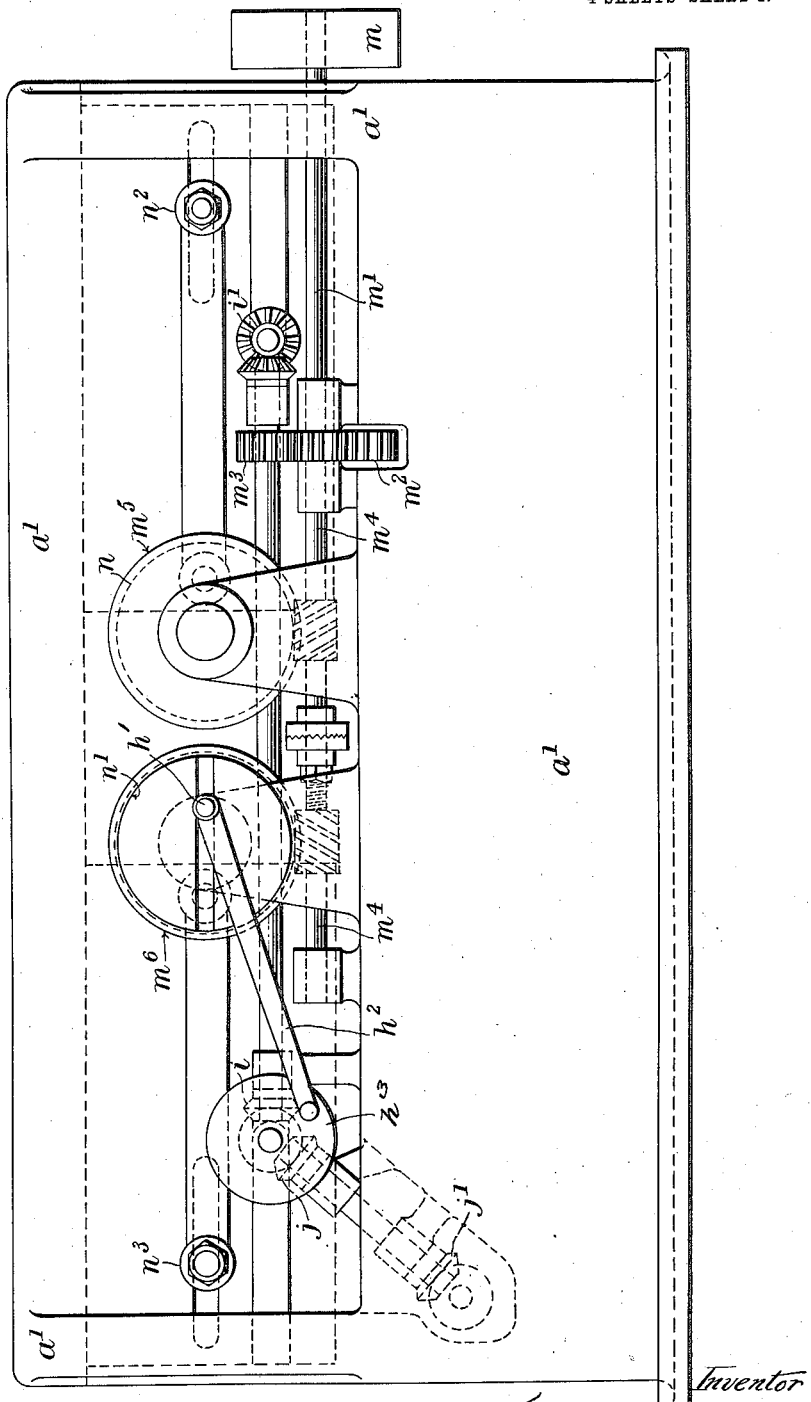

UNITED STATES PATENT OFFICE.

WILLIAM EDWIN SYKES, OF UXBRIDGE, ENGLAND.

MACHINE FOR CUTTING HELICAL TEETH OF GEAR-WHEELS.

1,103,851.   Specification of Letters Patent.   Patented July 14, 1914.

Application filed January 6, 1912. Serial No. 669,857.

*To all whom it may concern:*

Be it known that I, WILLIAM EDWIN SYKES, a subject of the King of the United Kingdom of Great Britain and Ireland, residing at 14 the Greenway, Uxbridge, Middlesex, England, have invented certain new and useful Improvements in Machines for Cutting Helical Teeth of Gear-Wheels, of which the following is a specification.

This invention relates to machines for cutting single helical or double helical or herring-bone toothed gear wheels, the object being to adopt the molding generating principle of action, well known in connection with machines for cutting ordinary spur wheels, by using cutters of pinion form. The helical teeth are inclined at an angle to each side face of the wheel, instead of being cut at right angles to each face like ordinary spur wheels. The machine may be used for cutting single helical teeth but is primarily intended for cutting double helical or herring-bone teeth, in which case the cutters may be arranged to advance and recede simultaneously in their reciprocating motion when cutting double helical teeth with a groove in the central part of the face of the wheel, or the cutters may be arranged to advance and recede alternately when cutting continuous teeth, that is, double helical teeth with the right and left hand portions joined together at the central part of the face of the wheel; the cutters would also be arranged to advance and recede alternately when cutting double helical teeth having the central ends of each pair of teeth overlapping or "staggered" as it is termed.

Figure 1 is a plan of the machine on two sheets, Fig. 2 is an end elevation of Fig. 1, Fig. 3 is a side elevation of Fig. 1, and Fig. 4 is a detail of the ratchet feed.

In these drawings $a$ denotes a saddle, on a suitable bed plate $a^1$, and $b$, $b^1$ are bearings mounted on the saddle to carry the revoluble head spindle $c$; $d$ is an arbor or mandrel mainly shown by dotted lines, extending from the spindle $c$ and journaled in the outer bearing $b^1$. The arbor or mandrel $d$ passes through a distance piece or chuck $e$, arranged and adapted to carry the wheel blank $f$, which represents the work to be done. A screw and nut, with washer $d^1$, on the arbor $d$, serve to tighten up and secure the wheel blank $f$.

The right and left hand cutters $g$, $g$, are each mounted on a suitable spindle to revolve in a bearing $g^1$, on the sliding carriage $g^2$; a rifled or quick pitch screw spindle $g^3$, being mounted in another bearing, also forming part of the carriage $g^2$. Each screw spindle $g^3$ has a double helical wheel $g^4$ mounted upon it, gearing into a pinion (indicated by dotted lines) adapted to turn its corresponding right or left hand cutter $g$, the motion being intermittent by means of each worm wheel $g^5$, mounted in bearings $b^2$, acting as a nut to its corresponding screw spindle $g^3$, when actuated by the worm shaft $h$ and ratchet feed inclosed within the periphery of wheel $h^3$, connecting rod $h^2$, and adjustable feed crank pin and crank $h^1$ on the left side of Fig. 1; the motion being also communicated to the right hand cutter through bevel wheels $i$, and $i^1$, and transmission shaft $i^2$.

The cutters which work with a shaping or planing action are each formed as a single helical pinion except that the teeth are made with "relief" or "clearance", and the ends are approximately square with the helical path so as to form efficient cutting edges. The helical angle of the cutter teeth is made to correspond with the angle of the teeth to be cut. Provision is made to allow the cutters to move slightly away from the work on the return stroke in order to prevent damage to the cutting edges. The bearings $g^1$ wherein the cutter spindles are journaled have a pivotal connection $g^x$ with the bearings $g^z$ in which the spindles $g^3$ are journaled, in consequence whereof, the movement of the cutters across the blank will cause the cutters and thereby the teeth to move slightly in an outward direction away from the blank. In this way, interference between the cutters and the blank is avoided on the return stroke, and the former are brought into position for a fresh cut when the forward movement of the carriages commences, the cutters being automatically restored to operative, (*i. e.*, cutting) position at the conclusion of their swinging movement in any suitable manner. In the same connection, it may here be stated that each cutter has two rotary motions, viz: an oscillatory or rotary reciprocatory motion produced by the reciprocation of the corresponding carriage $g^2$, which causes the spindle $g^3$ to turn forward and backward within the worm-wheel $g^5$, and an intermittent rotary movement in one direction produced by the turning of the said worm-wheel by the worm-shaft $h$, the latter movement causing the cutter to turn during each stroke of the carriage, in order to produce the molding generating action requisite to generate or shape the teeth.

The bevel wheel $i$, on the shaft $h$, also intermeshes with the wheel $j$ to drive through the bevels $j^1$ the shaft $j^2$, and through the train of change wheels $k$, the worm shaft $k^1$, operating the worm wheel $k^2$, which turns the head spindle $c$ and the wheel blank $f$ in one direction. It will be seen, therefore, that the intermittent feed motion derived from the adjustable feed $h^1$, $h^2$ and $h^3$ is transmitted simultaneously to the cutters $g$, $g$, and relatively through the change wheels $k$ to the wheel blank $f$ to be cut, and that this combined arrangement of parts may be termed the feed mechanism. The hand wheel $l$ on the screw shaft $l^1$, with its screw and nut shown in dotted lines, is adapted to move the saddle $a$ on its bed, thus adjusting the saddle for various diameters of wheel banks and also providing means for feeding the blanks against the cutters.

Motive power is applied in any known and convenient manner, but assuming the improved machine to be operated by a driving belt, the driving pulley $m$ transmits its motion through the shaft $m^1$, revolving in suitable bearings, by the toothed wheels $m^2$ and $m^3$ to the double worm shaft $m^4$, and worm wheels $m^5$, and $m^6$. These worm wheels are mounted upon suitable large spindles, indicated by dotted lines, revoluble in bearings $b^3$, $b^3$, the spindles also carrying the respective cranks $n$ and $n^1$, with an adjusting screw operating the crank pin and stroke, as indicated by dotted lines on crank $n^1$.

The crank $n$ reciprocates the right hand sliding carriage $g^2$ upon its bed by means of a connecting rod and pin attachment $n^2$; and the crank $n^1$ similarly reciprocates the left hand carriage by a corresponding connecting rod and pin attachment $n^3$, and these when working simultaneously from the position as shown in Fig. 1, advance the two sliding carriages $g^2$ toward each other, together with the right and left hand cutters $g$, so as to operate in cutting spaced grooves upon the wheel blank $f$. During the stroke the cutters $g$, $g$ are caused to turn by the turning of the screw spindles $g^3$ in the right and left hand stationary nuts formed in the worm wheels $g^5$, with the result of a right and left hand helical groove being cut on the blank, the cutters then returning by the motion of the cranks $n$ and $n^1$. During this return motion of the two sliding carriages $g^2$, $g^2$, the wheel blank $f$ is turned for the feed, the ratchet movement of the crank $h^3$ being on the forward stroke, and the cutters $g$, $g$, in returning by a straight line movement over the helical path cut on the right and left hand halves of the wheel blank $f$, are caused to turn in a corresponding degree by the turning of the screw spindles $g^3$, in the right and left hand nuts formed by the worm wheels $g^5$, $g^5$, and thus made ready for the following cut.

It will be evident from the foregoing description that the mechanism provided for rotating the cutters, $g$, $g$, and the wheel blank $f$, in unison, results in automatically generating or shaping the transverse section of the teeth, while, at the same time the helical direction of the teeth and spaces is developed from the right and left hand sides of the blank, to meet at the apex of the two curves at the center, or approximate central line of width of the wheel blank. In this case the cutters would meet and foul each other, either directly or by the chips from the two cutters gathering in the center, unless the difficulty is avoided by some means.

One method of clearing the cutters is to turn a groove in the center of the wheel blank face sufficiently wide and deep to avoid the cutters meeting while cutting the spaces between the teeth clear through to the central line; but the objection to this plan is that it destroys the continuity of the teeth at the apex, and reduces their strength. Another plan is to drill a small hole at the apex sufficient to clear the cutters and remove the "bur" or metal that would otherwise be left, in which case the cutters need not advance simultaneously from each face, a slight difference in time being given between the cutters. Another plan is to cut the teeth "staggering," that is for a tooth starting from one side to come directly opposite in the center of a space started from the other side; to do which the cranks $n$, $n^1$ operating the sliding carriages $g^2$, $g^2$, with the cutters $g$, $g$, are so set that their strokes alternate, but otherwise work in the same continuous manner as before, except that the feed would operate with one cutter on the forward stroke. To enable this to be done, suitable serrated clutch couplings, allowing of fine adjustment, are provided on the connecting shafts, as at $o$, on the shaft $i^2$, and at $o^1$, on the shaft $m^4$. These shafts being cut through at the coupling point, and the nuts which serve to keep the clutch parts in engagement, being slacked back on the thread cut on their respective shafts, the other half can be turned around to the desired point of stroke, and again coupled up for work.

What I claim is:—

1. In a machine for generating and cutting helical toothed gear wheels, the combination of a bed, means carried thereon for axially mounting and turning the wheel blank to be operated on, a second bed, a carriage mounted thereon and adapted to slide in a plane parallel with the face of the wheel blank, a cutter carried by said carriage, means for sliding said carriage, means for imparting a rocking motion to said cutter, and means for driving said wheel blank and said cutter simultaneously, substantially as described.

2. In a machine for generating and cutting helical toothed gear wheels, the combination of a slidable carriage, two sets of bearings thereon, a revoluble shaft mounted in one set of said bearings, a pinion carried by said shaft, a helical pinion shaped cutter mounted on one end of said shaft, a screw spindle adapted to revolve in the other set of said bearings, a gear wheel mounted on said spindle and engaging with said pinion, a nut engaging with said spindle, and means for sliding said spindle in said nut, substantially as described.

3. In a machine for generating and cutting helical toothed gear wheels, the combination of a slidable carriage, two sets of bearings thereon, a shaft revolubly mounted in one set of bearings and carrying a helical pinion shaped cutter, a screw spindle revolubly mounted in the other set of bearings, two engaging gear wheels mounted, respectively, on said shaft and said spindle, a nut engaging with and turning the said spindle, gear wheels and cutter during the endwise movement of said spindle with said carriage, and a revoluble crank and crank pin connected with the said slidable carriage, for operating the same, substantially as described.

4. In a machine for generating and cutting helical toothed gear wheels, the combination of a slidable carriage, bearings carried thereby, a rotatable shaft and a screw spindle adapted to turn in said bearings, gear connections between said shaft and spindle for imparting rotary motion from the latter to the former, a disk cutter in the form of a single helical pinion mounted on said shaft, a feeding mechanism adapted to actuate said cutter, and a revoluble crank operatively connected with said carriage to impart a reciprocatory movement thereto, substantially as described.

5. In a machine for generating and cutting helical toothed gear wheels, the combination of means for rotatably mounting a wheel blank on its axis, means for moving said wheel blank at right angles to its axis, a carriage, a rotatable helical pinion shaped cutter mounted on said carriage, means for sliding said carriage to and fro and simultaneously rocking said cutter on its axis, and a feeding mechanism adapted to act upon said cutter, substantially as described.

6. In a machine for generating and cutting helical toothed gear wheels, the combination of means for mounting and turning a wheel blank on its axis, a carriage and means for sliding it to and fro in a plane parallel with said axis, a cutter formed like a single helical pinion rotatably mounted on said carriage, means for rocking the said cutter upon its axis simultaneously with the to and fro motion of said carriage, means for feeding and withdrawing said cutter to and from said wheel blank, and change wheels and connecting mechanism for turning said wheel blank, when mounted, concurrently with the sliding and rocking motions of said cutter, substantially as described.

7. In a machine for generating and cutting double helical or herring-bone toothed gear wheels, the combination of a bed, means carried thereon for axially mounting and turning the wheel blank to be operated on, a second bed arranged lengthwise in a plane parallel with said axis, two carriages mounted on said bed, a pinion shaped cutter carried by each carriage, means for reciprocating said carriages, means for imparting a rocking motion to said cutters, and means for driving said wheel blank and said cutters simultaneously, substantially as described.

8. In a machine for generating and cutting double helical or herring-bone toothed gear wheels, the combination of means for mounting and turning a wheel blank on its axis, a bed arranged lengthwise in a plane parallel with said axis, two carriages mounted on said bed, means for imparting a reciprocatory movement to said carriages, a cutter formed as a single helical pinion mounted in each of said carriages, means adapted to impart an intermittent feed motion to said cutters, and means for adjusting the relative positions of said cutters with respect to each other and to the work being done, substantially as described.

9. In a machine for generating and cutting double helical or herring-bone toothed gear wheels, the combination of means for mounting and turning a wheel blank on its axis, a bed arranged lengthwise in a plane parallel with said axis, two carriages mounted on said bed, a cutter formed as a single helical pinion mounted in each carriage, means adapted to turn both said cutters in their carriages, and a crank operatively connected to each carriage for causing the same to slide to and fro upon said bed in front of the periphery of said wheel blank, substantially as described.

10. In a machine for generating and cutting double helical or herring-bone toothed gear wheels, the combination of means for mounting and turning a wheel blank on its axis, a bed arranged lengthwise in a plane parallel with said axis, two carriages mounted on said bed, a cutter formed as a single helical pinion mounted in each carriage, means adapted to axially turn each of said cutters in its carriage, a crank operatively connected to each carriage for causing the same to slide to and fro upon said bed in front of the periphery of said wheel blank, and means for regulating or adjusting the relative positions of the cutters with relation to the work, substantially as described.

11. In a machine for generating and cutting double helical or herring-bone toothed gear wheels, the combination of means for mounting and turning a wheel blank on its axis, a bed arranged lengthwise in a plane parallel with said axis, two carriages mounted on said bed, means for imparting a reciprocatory movement to said carriages, a cutter formed as a single helical pinion mounted in each of said carriages, means adapted to impart an intermittent feed motion to said cutters, means for adjusting the relative positions of said cutters with respect to each other and to the work being done, and means for throwing one cutter and its supporting carriage out of operation, substantially as described.

In testimony whereof I have hereunto set my hand in presence of two subscribing witnesses.

WILLIAM EDWIN SYKES.

Witnesses:
JOSEPH SINCLAIR FAIRFAX,
HENRY JOHN BROCKWELL.